United States Patent
Tiwari

(10) Patent No.: US 9,313,819 B2
(45) Date of Patent: Apr. 12, 2016

(54) METHOD OF HANDLING SERVICE REJECTION FOR CIRCUIT SWITCH SERVICE

(71) Applicant: HTC Corporation, Taoyuan County (TW)

(72) Inventor: Kundan Tiwari, Taoyuan County (TW)

(73) Assignee: HTC Corporation, Taoyuan District, Taoyuan (TW)

( * ) Notice: Subject to any disclaimer, the term of this patent is extended or adjusted under 35 U.S.C. 154(b) by 546 days.

(21) Appl. No.: 13/633,881

(22) Filed: Oct. 3, 2012

(65) Prior Publication Data
US 2013/0083732 A1 Apr. 4, 2013

Related U.S. Application Data

(60) Provisional application No. 61/542,297, filed on Oct. 3, 2011.

(51) Int. Cl.
*H04W 76/02* (2009.01)
*H04W 36/00* (2009.01)
*H04W 88/06* (2009.01)

(52) U.S. Cl.
CPC ........ *H04W 76/027* (2013.01); *H04W 36/0022* (2013.01); *H04W 88/06* (2013.01)

(58) Field of Classification Search
None
See application file for complete search history.

(56) References Cited

FOREIGN PATENT DOCUMENTS

| CN | 101835127 A | 9/2010 |
|---|---|---|
| WO | 2011053824 A2 | 5/2011 |
| WO | 2011053824 A3 | 5/2011 |

OTHER PUBLICATIONS

Office action mailed on Sep. 30, 2014 for the China application No. 201210377983.1, filing date: Oct. 8, 2012.
European patent application No. 12006855.6, European Search Report mailing date: Apr. 3, 2013.
3GPP TS 24.301 V11.0.0 (Sep. 2011), "3rd Generation Partnership Project; Technical Specification Group Core Network and Terminals; Non-Access-Stratum (NAS) protocol for Evolved Packet System (EPS); Stage 3 (Release 11)", XP050554122, p. 1-322.
HTC, "Correction to the Service request procedure", 3GPP TSG CT WG1 Meeting #74, C1-114262, Oct. 10-14, 2011, Hyderabad (India), XP050534501.
3GPP TS 24.301 V10.4.0 3rd Generation Partnership Project; Technical Specification Group Core Network and Terminals; Non-Access-Stratum (NAS) protocol for Evolved Packet System (EPS); Stage 3 (Release 10), Sep. 2011.

*Primary Examiner* — Jackie Zuniga Abad
(74) *Attorney, Agent, or Firm* — Winston Hsu; Scott Margo

(57) ABSTRACT

A method of handling service rejection for circuit switch service for a mobile device in a wireless communication system is disclosed. The method comprises receiving a service reject message with not available circuit switch service cause and a non zero timer value for a timer whose running state indicates that the mobile device is not allowed to send a extended service request message for a circuit switch service, from a network of the wireless communication system, starting the timer with the non zero timer value, and sending the extended service request message for a packet service to the network even when the timer is running.

2 Claims, 3 Drawing Sheets

METHOD OF HANDLING SERVICE REJECTION FOR CIRCUIT SWITCH SERVICE

CROSS REFERENCE TO RELATED APPLICATIONS

This application claims the benefit of U.S. Provisional Application No. 61/542,297, filed on Oct. 3, 2011 and entitled "Method to handle service request procedure for the delay tolerant device", the contents of which are incorporated herein in their entirety.

BACKGROUND OF THE INVENTION

1. Field of the Invention

The application relates to a method utilized in a wireless communication system, and more particularly, to a method of handling service rejection for circuit switch service in a wireless communication system.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of mobile stations, also referred as user equipments (UEs).

In the LTE system, a UE performs a service request procedure for transferring the EMM mode from EMM-IDLE to EMM-CONNECTED mode and establish the radio and S1 bearers when uplink user data or signalling is to be sent. Note that, a UE is in EMM-IDLE mode when no NAS signalling connection between UE and network exists, and a UE is in EMM-CONNECTED mode when a NAS signalling connection between UE and network is established. Another purpose of the service request procedure is to invoke mobile originating (MO)/mobile terminating (MT) CS fallback or 1xCS fallback procedures.

Moreover, if the UE is configured for NAS signalling low priority, and the last received ATTACH ACCEPT message or TRACKING AREA UPDATE ACCEPT message from the network indicated that the network supports use of EXTENDED SERVICE REQUEST for packet services, the UE shall send an EXTENDED SERVICE REQUEST message with service type set to "packet services via S1". If the last received ATTACH ACCEPT message or TRACKING AREA UPDATE ACCEPT message from the network did not indicate that the network supports use of EXTENDED SERVICE REQUEST for packet services, the UE shall instead send a SERVICE REQUEST message. After sending the SERVICE REQUEST message or EXTENDED SERVICE REQUEST message with service type set to "packet services via S1", the UE shall start T3417 and enter the state EMM-SERVICE-REQUEST-INITIATED. Note that, a UE enters the state EMM-SERVICE-REQUEST-INITIATED after it has started the service request procedure and is waiting for a response from the MME.

However, the service request procedure may be not accepted by the network. If the service request cannot be accepted, the network returns a SERVICE REJECT message to the UE including an appropriate EPS Mobility Management (EMM) cause value. When the EMM cause value is #39 "CS service temporarily not available", the MME shall include a value for timer T3442 in the SERVICE REJECT message. On the other hand, if a mobile terminating CS fallback call is aborted by the network during call establishment, the MME shall include the EMM cause value #39 "CS service temporarily not available" and set the value of timer T3442 to zero.

In addition, if the timer T3442 value received in the SERVICE REJECT message is not zero, the UE shall start timer T3442. On the other hand, if the T3442 value received in the SERVICE REJECT message is zero, the UE shall not start timer T3442. Note that, the UE shall not try to send an EXTENDED SERVICE REQUEST message for mobile originating services to the network, except for mobile originating CS fallback for emergency calls, until timer T3442 expires or the UE sends a TRACKING AREA UPDATE REQUEST message.

As abovementioned, the UE may uses EXTENDED SERVICE REQUEST message for packet services if it has been indicated that the network supports use of EXTENDED SERVICE REQUEST for packet services in the ATTACH ACCEPT message or TRACKING AREA UPDATE ACCEPT message. Nevertheless, the applicant notices a problem associated to SERVICE REJECT with cause of CS service temporarily not available. In detail, the UE is not allowed to send EXTENDED SERVICE REQUEST message when the timer T3442 is running. In other words, the UE is not allowed to initiate mobile originating service during this time when the network rejects the UE with EMM cause #39 (CS service temporarily not available) with timer T3442. This will impact the mobile originated data service as the UE is not allowed to send EXTENDED SERVICE REQUEST message for mobile originated data service while timer T3442 is running. However, the UE shall be allowed to use PS service even though the CS service is not available. Therefore, the abovementioned behavior causes mobile originated data service delay.

SUMMARY OF THE INVENTION

The application discloses a method of handling service rejection for circuit switch service to solve the abovementioned problem.

The present invention discloses a method of handling service rejection for circuit switch service for a mobile device in a wireless communication system is disclosed. The method comprises receiving a service reject message with not available circuit switch service cause and a non zero timer value for a timer whose running state indicates that the mobile device is not allowed to send a extended service request message for a circuit switch service, from a network of the wireless communication system, starting the timer with the non zero timer value, and sending the extended service request message for a packet service to the network even when the timer is running.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
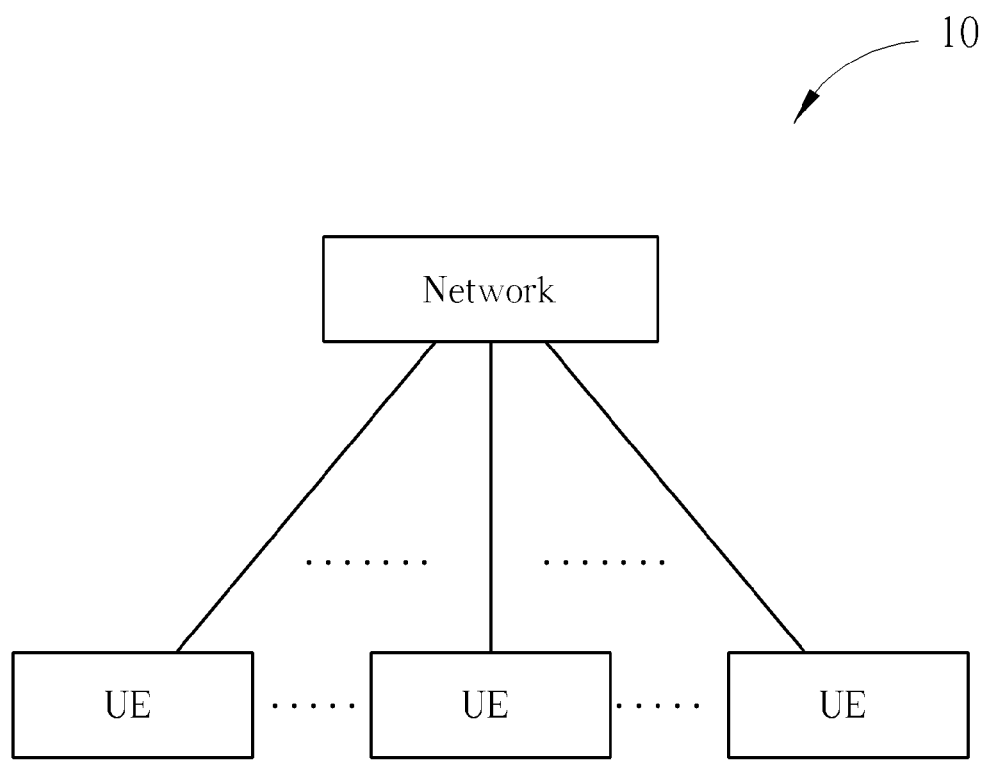
FIG. 1 illustrates a schematic diagram of an exemplary wireless communication system.

Please refer to FIG. 1, which is a schematic diagram of a wireless communication system 10. The wireless communication system 10 is a Long-Term Evolution (LTE) system or other mobile communication systems, and is briefly composed of a network and a plurality of user equipments (UEs). In FIG. 1, the network and the UEs are simply utilized for illustrating the structure of the wireless communication system 10. Practically, the network may be an evolved universal terrestrial radio access network (E-UTRAN) comprising a plurality of evolved base stations (eNBs). The UEs can be devices such as mobile phones, computer systems, etc. Besides, the network and the UE can be seen as a transmitter or receiver according to transmission direction, e.g., for uplink (UL), the UE is the transmitter and the network is the receiver, and for downlink (DL), the network is the transmitter and the UE is the receiver.

Figure 2:
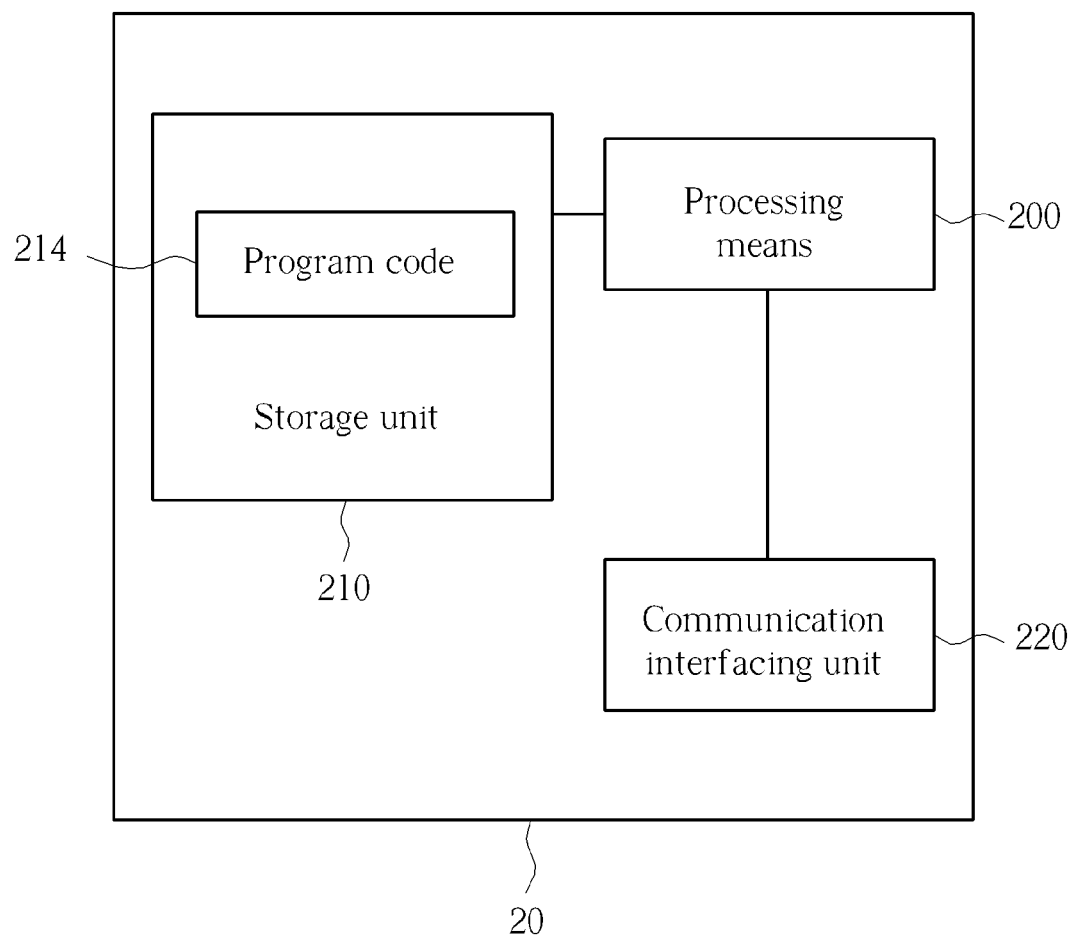
FIG. 2 illustrates a schematic diagram of an exemplary communication device.

FIG. 2 illustrates a schematic diagram of an exemplary communication device 20. The communication device 20 can be the UE shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that can store program code 214, for access by the processing means 200. Examples of the storage unit 210 include but are not limited to a subscriber identity module (SIM), read-only memory (ROM), flash memory, random-access memory (RAM), CD-ROMs, magnetic tape, hard disk, and optical data storage device. The communication interfacing unit 220 is preferably a radio transceiver and can exchange wireless signals with the network according to processing results of the processing means 200.

Figure 3:
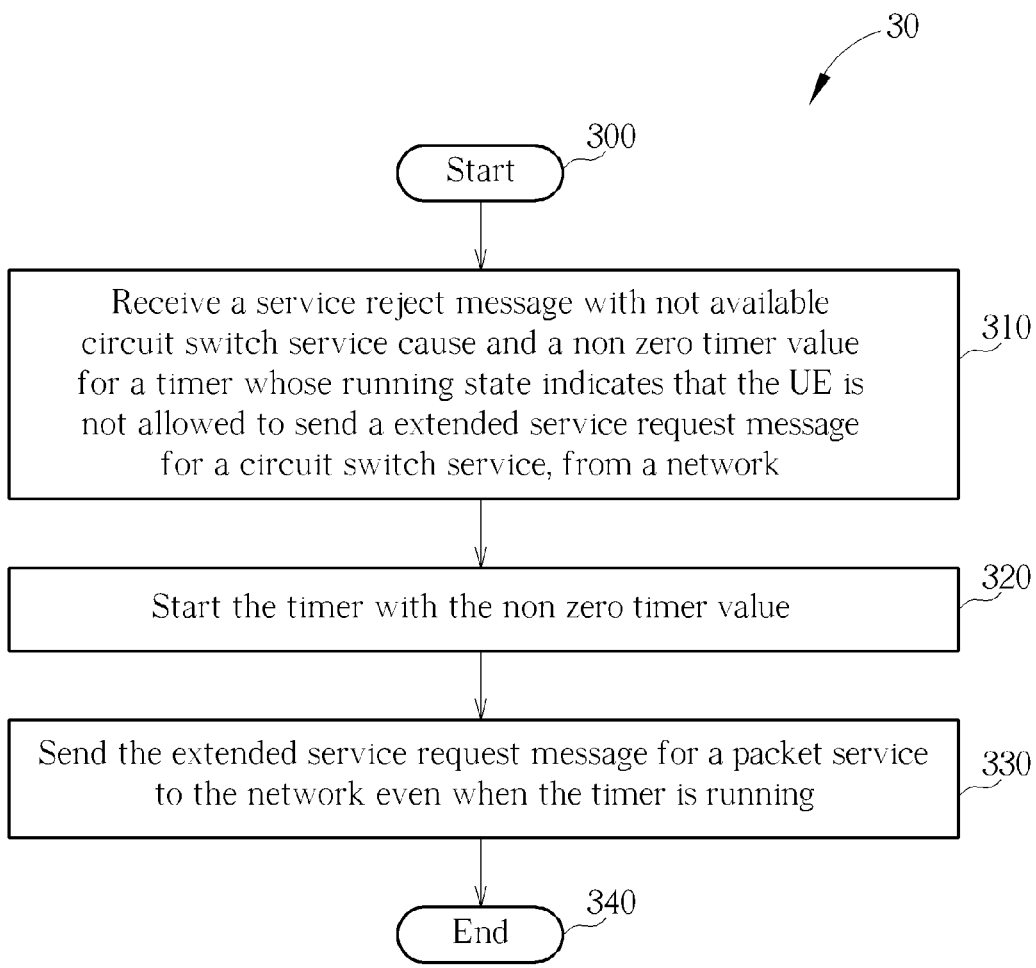
FIG. 3 is a flowchart of an exemplary process.

Please refer to FIG. 3, which illustrates a flowchart of an exemplary process 30. The process 30 is utilized in a UE for handling service rejection for circuit switch service. The process 30 can be compiled into the program code 214 and includes the following steps:

Step 300: Start.

Step 310: Receive a service reject message with not available circuit switch service cause and a non zero timer value for a timer whose running state indicates that the UE is not allowed to send a extended service request message for a circuit switch service, from a network.

Step 320: Start the timer with the non zero timer value.

Step 330: Send the extended service request message for a packet service to the network even when the timer is running.

Step 340: End.

According to the process 30, the UE is allowed to send extended service request message for mobile originating packet service when the timer (i.e. timer T3442) is running or the circuit switch service is not available. Thus, mobile originating packet service is not delayed due to circuit switch service is not available.

Take an example based on the process 30. A UE initiates a EXTENDED SERVICE REQUEST message to get mobile originating circuit service and the network rejects the EXTENDED SERVICE REQUEST message with a SERVICE REJECT message with EMM cause #39 (CS service temporarily not available) with non zero timer value for timer T3442. After that, the UE runs the timer T3442 with the given value. In addition, the UE is allowed to send the EXTENDED SERVICE REQUEST message to get mobile originating packet service even when the timer T3442 is running, so as to avoid mobile originating data service delay. The functionality of the timer T3442 shall be well-known in the art, so it is not given herein.

Please note that, the abovementioned steps of the processes including suggested steps can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (Sip), computer on module (COM), and the communication device 20.

In conclusion, the present invention provides a method of handling service reject for CS service. The UE is allowed to send EXTENDED SERVICE REQUEST message for PS service even when the timer T3442 is running or CS service is temporarily not available, so as to avoid mobile originating data service delay.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling service rejection for circuit switch service for a mobile device in a wireless communication system, the method comprising:
    receiving a service reject message with not available circuit switch service cause and a non zero timer value for a timer whose running state indicates that the mobile device is not allowed to send an extended service request message for a circuit switch service, from a network of the wireless communication system, wherein the service reject message with not available circuit switch service cause includes EPS (Evolved Packet System) Mobility Management (EMM) cause #39 indicating circuit switch service temporarily not available;
    starting the timer with the non zero timer value, wherein the timer is timer T3442; and
    sending the extended service request message for a packet service to the network even when the timer is running and circuit switch service is temporarily not available.

2. The method of claim 1, wherein the packet service includes mobile originating packet service.

* * * * *